(12) United States Patent
Inage (10) Patent No.: US 6,867,885 B2
(45) Date of Patent: Mar. 15, 2005

(54) IMAGE READING APPARATUS WITH ADJUSTING LINES OF IMAGE DATA TAKEN

(75) Inventor: Osamu Inage, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 574 days.

(21) Appl. No.: 09/735,943

(22) Filed: Dec. 14, 2000

(65) Prior Publication Data

US 2002/0135812 A1 Sep. 26, 2002

(30) Foreign Application Priority Data

Dec. 14, 1999 (JP) .......................................... 11-353829

(51) Int. Cl.⁷ ................................................. H04N 1/40
(52) U.S. Cl. ..................... 358/443; 250/208.1; 382/312
(58) Field of Search ................. 358/521, 520, 358/443, 525, 496, 461, 463, 3.22, 3.24, 3.27, 445, 446, 447, 464, 442; 382/264, 237, 318, 321, 179, 187, 101; 348/88; 250/208.1

(56) References Cited

U.S. PATENT DOCUMENTS 4,894,727 A * 1/1990 Sasaki ........................ 382/264
5,408,335 A * 4/1995 Takahashi et al. .......... 358/443

FOREIGN PATENT DOCUMENTS

JP              10193685 A   *   7/1998   .............. B41J/2/44

* cited by examiner

Primary Examiner—Edward Coles
Assistant Examiner—Heather D. Gibbs
(74) Attorney, Agent, or Firm—Oblon, Spivak, McClelland, Maier & Neustadt, P.C.

(57) ABSTRACT

An image reading apparatus includes a photoelectric transducer which reads an image of a document and outputs an analog image signal, an A/D converter which converts the analog signal to a digital image signal, and an offset level detecting circuit which determines an average value of output levels from picture elements in a predetermined range of the photoelectric transducer. Further, there is an offset setting unit which provides an offset in the analog image signal before the A/D conversion on the basis of the average value, a first comparing device which compares the average value to a predetermined target value, and an adjusting device which adjusts a size of the predetermined range of the photoelectric transducer on the basis of the result of the comparison.

14 Claims, 7 Drawing Sheets

|  | DIFFERENCE BETWEEN AVERAGE VALUE OF OFFSET LEVELS AND TARGET VALUE | NUMBER OF LINES TAKING IN DATA |
|---|---|---|
|  | 5 OR MORE | 4 |
|  | LESS THAN 5 | 8 |
| TEMPORARY STANDARD VALUE → | LESS THAN 2 | 16 |
| STANDARD VALUE → | LESS THAN 1 | END OF ADJUSTMENT |

FIG. 9

IMAGE READING APPARATUS WITH ADJUSTING LINES OF IMAGE DATA TAKEN

BACKGROUND OF THE INVENTION

1. Filed of the Invention

The present invention relates to an image reading apparatus which reads a document, and to a copying machine having the image reading apparatus.

2. Discussion of Background

Recently, protection of the environment and saving energy are demanded, and standards for the purpose of saving energy such as Energy Star and ZESM etc. have been established in a field of a copying machine etc. Those standards provide limitation of consumption of energy during waiting time. In response to those standards, most of copying machines are designed such that during the waiting time, power sources of a fixing heater and an operation panel etc., whose consumption power is relatively large, are switched off or switched to a low power operation. In an image reading apparatus installed in a copying machine, it is general rule that power sources of all devices are turned off.

When using a copying machine which is in a state of the power being turned off or in the low power operation, after the power is turned on, a user is forced to wait until the copying machine becomes usable. At this time, in order to turn the copying machine in a usable state, in the image reading apparatus installed in the copying machine, generally, the following adjustments are necessary;

Adjustment of amplifying degree for amplifying an analog image signal at proper large amplitude Adjustment of offset level for making black level at optimum value In the technique disclosed in Japanese Laid Open-Patent Publication No. 6-326867, in an image reading apparatus, the above adjustments are executed when the power is turned on so that a read analog image signal can be accurately converted to a digital image signal.

Further, in the adjustment of the offset level, data of a predetermined number of lines is read while changing a setting value for adjustment, and an offset setting value which is optimum is determined by calculation formula, and then the offset level is adjusted.

In the technique which adjusts the offset level as described above, because only data of limited predetermined number of lines is read, the adjustment time is short. However, on the other hand, because the offset value is sought indirectly from the calculation formula, there is a problem that a slight setting error occurs.

SUMMARY AND OBJECT OF THE INVENTION

Accordingly, an object of the present invention is to provide an image reading apparatus and a copying machine in which adjustment accuracy of the offset level is improved and adjustment time is made short.

Another object of the present invention is to provide an image reading apparatus and a copying machine in which the final offset adjustment can be executed accurately in a state of low noise.

Another object of the present invention is to provide an image reading apparatus and a copying machine in which the circuit structure can be made simple.

Those and other objects and advantages are achieved by the present invention which provides an image reading apparatus including, a photoelectric transducer which reads an image of a document and outputs an analog image signal, an A/D converter which converts the analog signal to a digital image signal, an offset level detecting circuit which seeks an average value of output levels from picture elements in a predetermined range of the photoelectric transducer, an offset setting unit which provides an offset in the analog image signal before the A/D conversion on the basis of the average value, a first comparing device which compares the average value to a predetermined target value, and an adjusting device which adjusts a size of the predetermined range of the photoelectric transducer on the basis of the result of the comparison.

BRIEF DESCRIPTION OF THE DRAWINGS

In describing a preferred embodiment of the present invention illustrated in the drawings, specified terminology is employed for the sake of clarity. However, the invention is not intended to be limited to the specific terminology so selected, and it is to be understood that each specific element includes all technical equivalents which operate in a similar purpose.

A more complete appreciation of the present invention and many of the attendant advantages thereof will be readily obtained as the same becomes better understood by reference to the following detailed description, particularly when considered in connection with the accompanying drawings, wherein.

DETAILED DESCRIPTION OF THE PREFERRED EMBODIMENTS

Preferring now to the drawings, wherein like reference numerals designate identical or corresponding parts throughout the several views, preferred embodiments of the present invention are described.

Figure 1:
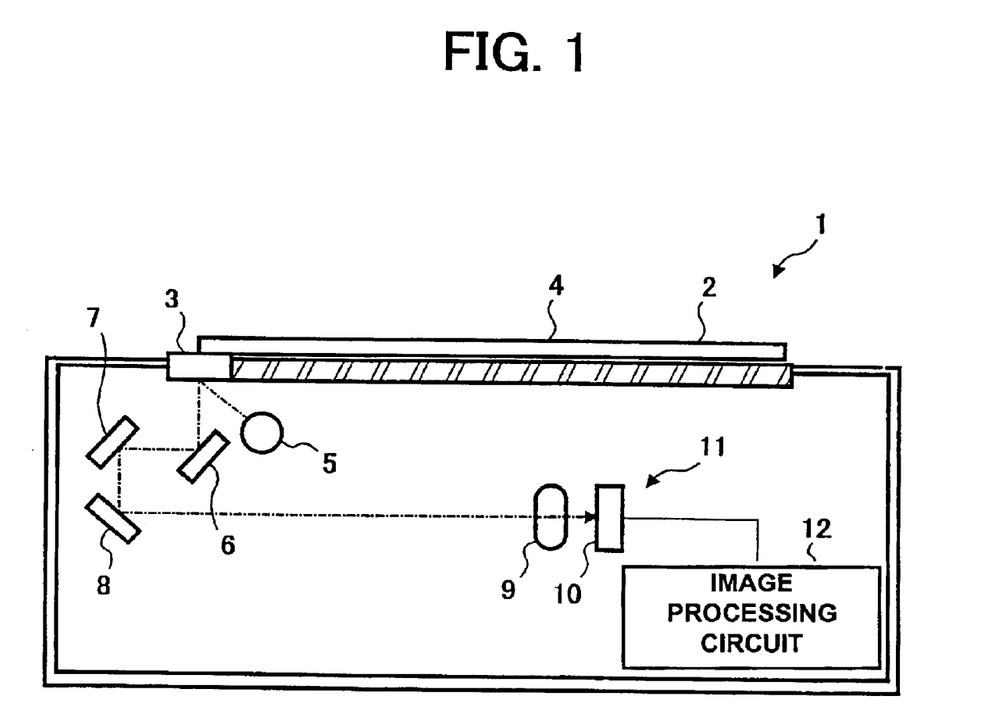
FIG. 1 is a block diagram illustrating the structure of an image reading apparatus of a first embodiment of the present invention.

FIG. 1 is a block diagram illustrating structure of an image reading apparatus of the first embodiment of the present invention. As illustrated in FIG. 1, in the image reading apparatus 1, a contact glass 2 and a white reference board 3 are installed. A document 4 is set on the contact glass 2 when reading an image of the document 4, and the document is pressed by a pressing board (not illustrated in FIG. 1) so that it cannot be floated from the contact glass 2. The white reference board 3 is an almost white member of uniform density, which is installed in a main scanning direction in order to obtain correction data during shading correction. Further, ADF (Auto Document Feeder) of known structure may be installed in the image reading apparatus 1.

A light source 5 illuminates at an angle a reading side of the white reference board 3 or the contact glass 2, and an emitted light from the light source 5 which is reflected on the white reference board 3 or the document 4 on the contact glass 2 is incident to a CCD 10 which functions as a photoelectric transducer by way of three mirrors 6, 7, and 8 and a lens 9.

The light source 5 and the mirror 6 are installed in a first moving device (not illustrated in FIG. 1), and the mirrors 7 and 8 are installed in a second moving device (not illustrated in FIG. 1). The first moving device and second moving device are moved in a sub scanning direction by being driven by a motor (not illustrated in FIG. 1) so as to keep constant distance between the reading side of the document 4 and the CCD 10.

The CCD 10 is installed on a sensor board 11, and outputs voltage, in accordance with the amount of the incident light, as an analog image signal. Predetermined processing is executed on the analog image signal by the sensor board 11, and then the analog signal is transferred as a digital signal to an image processing circuit on an image processing circuit board 12.

Figure 2:
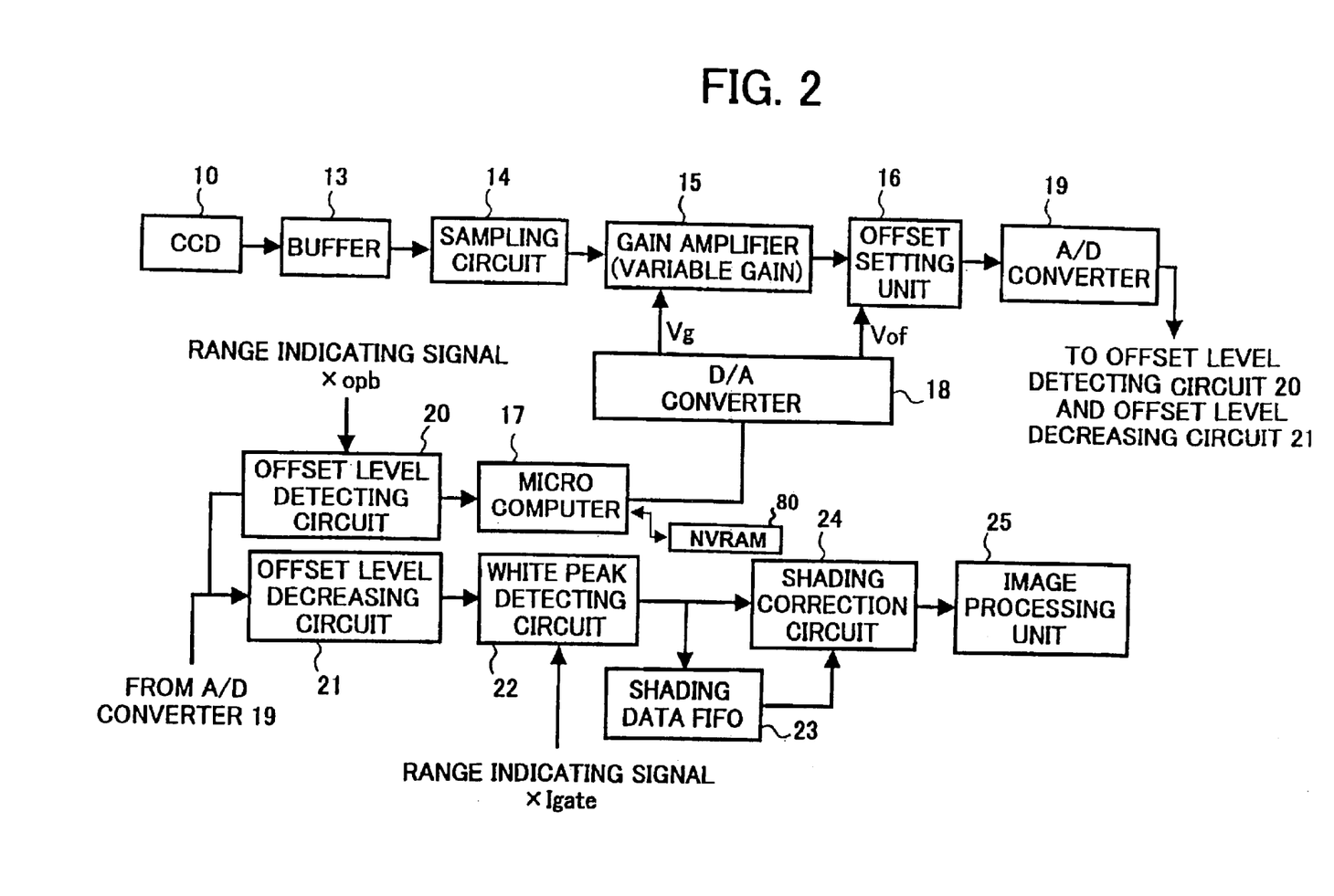
FIG. 2 is a block diagram illustrating the structure of circuits on a sensor board and an image processing circuit board of the image reading apparatus.

FIG. 2 is a block diagram illustrating the structure of circuits on the sensor board 11 and the image processing circuit board 12. The CCD 10 converts the reflected light from the document 4 into the analog signal. In FIG. 2, only one line of output from the CCD 10 is illustrated. However, any number of output lines may be utilized as desired, and two or four lines may be provided in a CCD of a high speed type.

Figure 3:
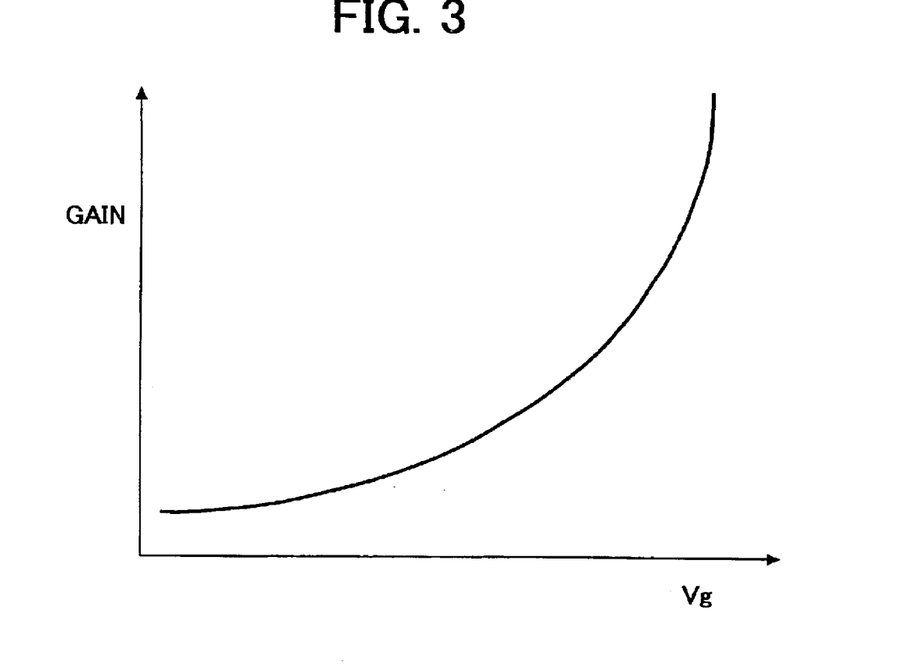
FIG. 3 is a graph illustrating a relationship between voltage Vg and the gain of a gain amplifier of the image reading apparatus.

The analog image signal which is output from the CCD 10 is driven by a buffer 13, and is then sampled and held in a sampling circuit 14 so that the high frequency component of reset noise etc. is reduced. A gain amplifier 15 controls gain by voltage Vg applied to a control terminal of the gain amplifier 15. FIG. 3 illustrates an example of a relationship between voltage Vg and gain.

Figure 4:
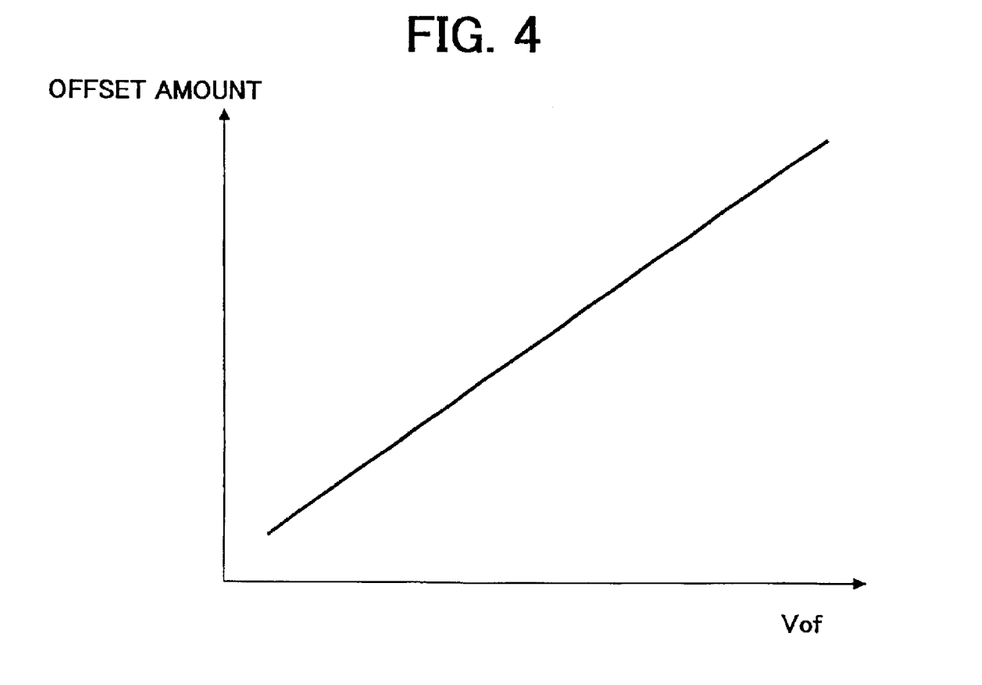
FIG. 4 is a graph illustrating a relationship between voltage Vof and the offset amount of an offset setting unit of the image reading apparatus.

An offset setting unit 16 has the function of providing the analog signal with offset by the voltage Vof applied to the control terminal of the offset setting unit 16. FIG. 4 illustrates an example of a relationship between voltage Vof and offset amount. The offset level is the reference level of the image signal. Generally, the reference level of the image signal is an output signal level when a deep black document or image is read. As the document image becomes white, the image signal is output while a value is added on the offset level.

The voltages Vg and Vof are determined by a microcomputer 17, which controls integratedly each unit in the image reading apparatus 1, by operating a D/A converter 18. For example, if the D/A converter 18 is 8 bits, the microcomputer 17 sets one value within 0–255 to the D/A converter 18, and the D/A converter 18 outputs the voltage in accordance with the value. In this case, a system for adjusting an offset is configured to be such that the changing amount of the digital image data is about 0.2 LSB when the setting value of the D/A converter 18 changes by one. However, any desired type or number of alternate D/A converters may be utilized. A NVRAM (non-volatile RAM) 80 is utilized to store a setting value utilized by the D/A converter 18.

An A/D converter 19 converts an analog image signal into a digital image signal at a predetermined resolution (for example 8 bits) on the basis of an upper limit reference value and a lower limit reference value. In order to cause the A/D converter 19 to fully display its accuracy, gain amount of the gain amplifier 15 and offset D amount of the offset setting unit 16 must be adjusted so that the analog image signal is changed greatly between the upper limit value and the lower limit value of the A/D converter 19.

Figure 5:
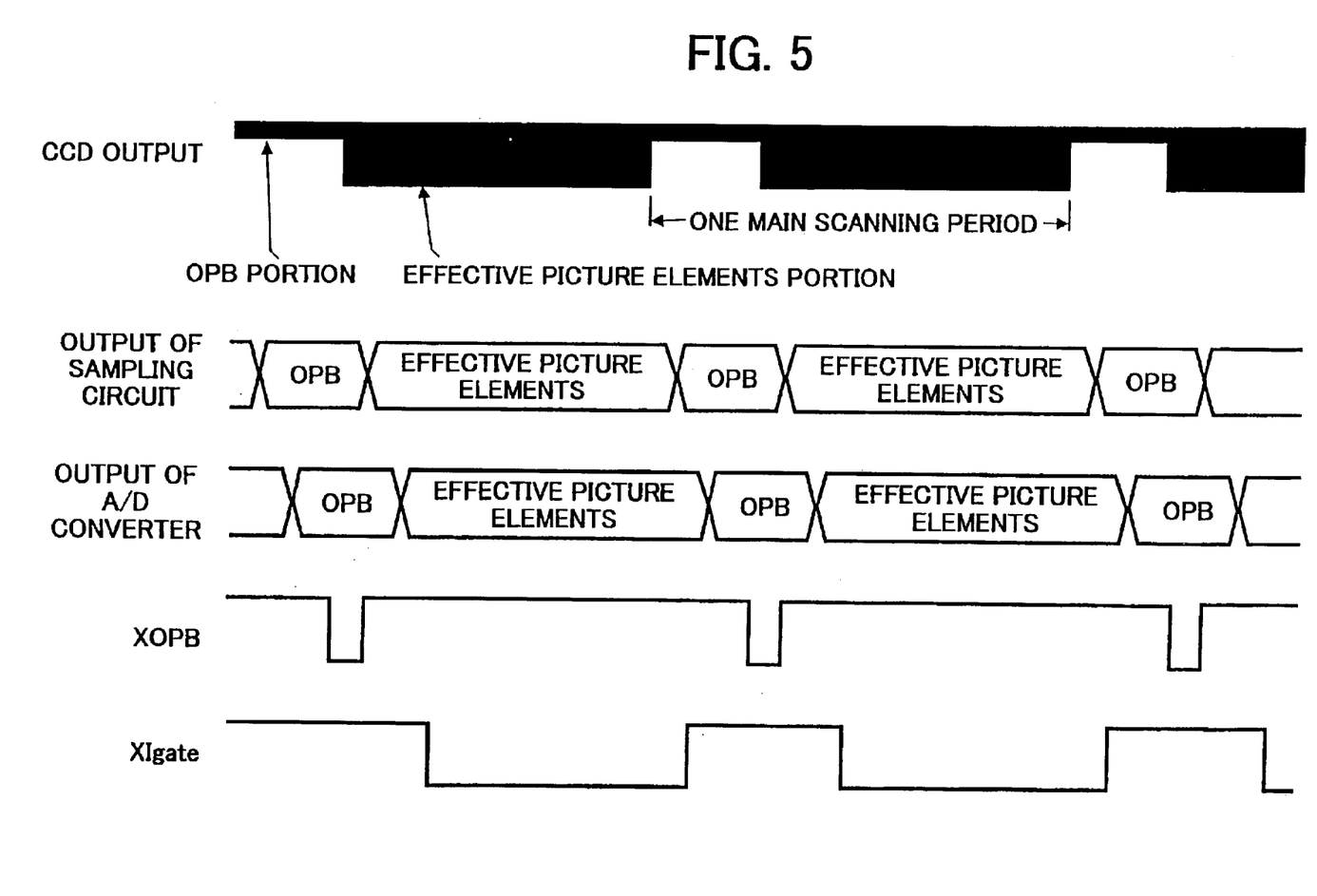
FIG. 5 is a timing chart of each signal of the circuits illustrated in FIG. 2.

An offset level detecting circuit 20 has a function to take in and store output levels from the output of the A/D converter 19 during a period (XOPBpe riod) corresponding to OPB (optical black) picture elements of the CCD 10, which is indicated by a range indication signal (xopb signal). The stored output level is an average value of output levels taken from plural OPB picture elements, and is stored for each channel of the CCD 10. FIG. 5 illustrates an example of the timing.

The microcomputer 17 obtains an average value of the output level of the CCD 10 during the latest XOPB period by accessing to the offset level detecting circuit 20. In this embodiment, in the XOPB period, the resolution is 32 picture elements (each 16 picture elements of EVEN or ODD), and because the XOPB period occurs once in one line, a data amount taken in one line is 32 picture elements. The microcomputer 17 calculates and sets the setting value of the D/A converter 18 on the basis of a value which is read from the offset level detecting circuit 20.

In this case, if noise is not included in the data, as the number of data taken in during offset adjustment is smaller, the adjustment is ended in shorter time. However, if the noise is included, there is a high possibility that the offset adjustment value is not proper or the adjustment itself is ended in error. Conventionally, generally, in order to reduce effect of the noise, data of plural lines are taking in data and are averaged, and the next setting value to the D/A converter 18 is determined using the average value. In that case, as the number of lines taken in is larger, contribution rate of the noise is lower, however, there is a problem that the adjustment time becomes longer.

Therefore, in this image reading apparatus 1, when a difference between a target value and an offset output value is large as when the adjustment has just started, because the offset output value has only to be made close to the target value roughly, the number of lines taking in data is made small. On the other hand, when the difference is small, the number of lines is made large (see the process of FIGS. 6 and 7, described below).

An offset level decreasing circuit 21 executes correction of the black level when the output of effective picture elements of the CCD 10 is input, by decreasing the value stored in the offset level detecting circuit 20 from an output value of effective picture elements of the CCD 10.

A white peak detecting circuit 22 stores, with respect to the output of the offset level decreasing circuit 21, a peak value within a range indicated by a range indicating signal xlgate. FIG. 5 illustrates an example of timing of the signal xlgate.

A shading data FIFO (First Input and First Output circuit) 23 is a memory in which image data, which has been obtained by reading the white reference board 3, is stored sequentially, while performing the process of averaging etc.

on the image data for each picture element. A shading correction circuit 24 executes shading correction on the digital image data by calculation on the basis of the digital image data which has been obtained by reading the document 4 and the read data of the white reference board 3 which is stored in the shading data FIFO circuit 23. The digital image data after the shading correction is output to an image processing unit 25 which executes various kinds of image processes.

Next, referring to a flowchart illustrated in FIGS. 6 and 7, offset adjustment executed by the microcomputer 17 will be described. Other devices and functions (both software and/or hardware) may be utilized to carry out the invention including specialized circuitry or chips.

Figure 6:
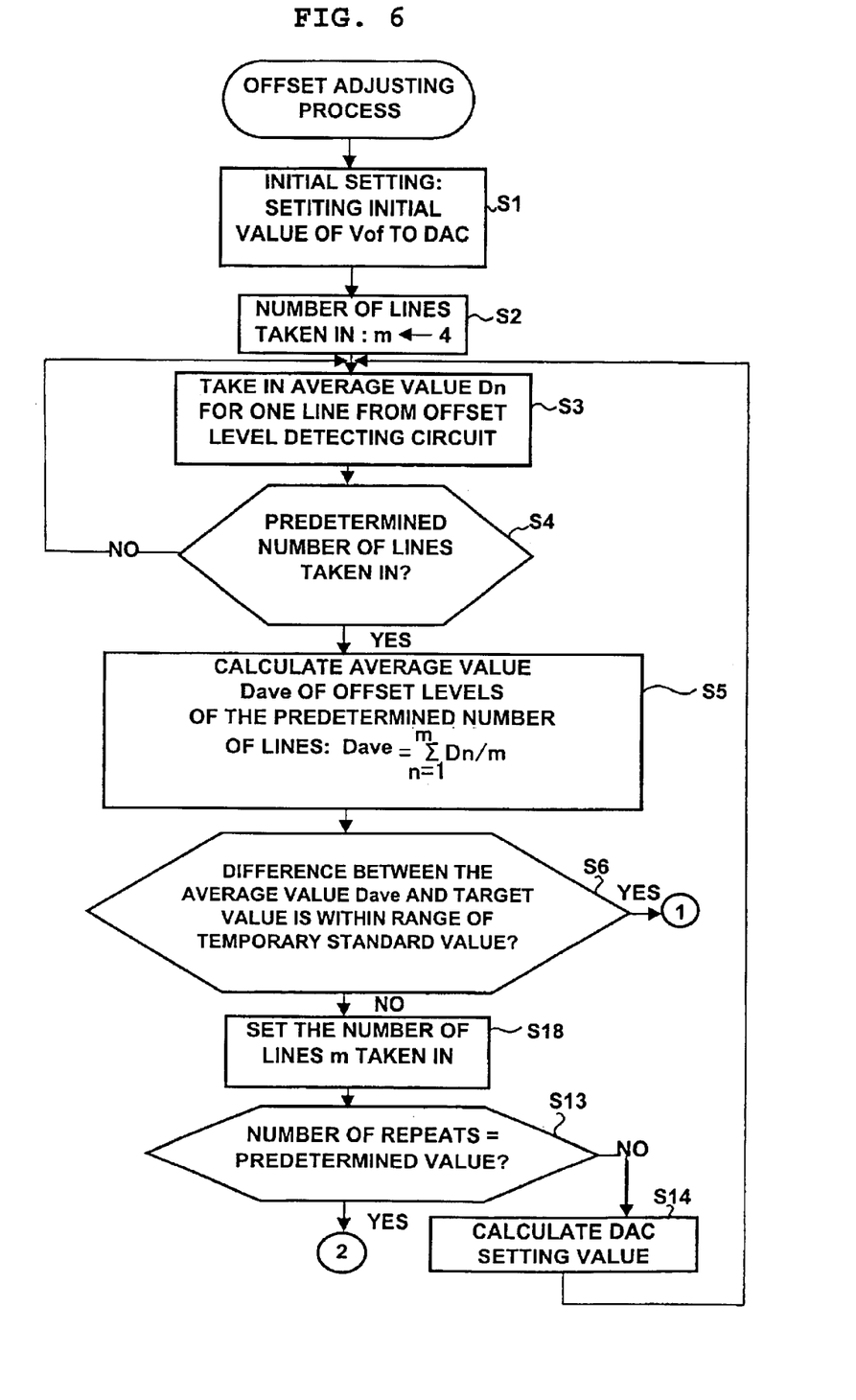
FIG. 6 is a flowchart indicating a portion of an offset adjustment process which the image reading apparatus executes.
Figure 7:
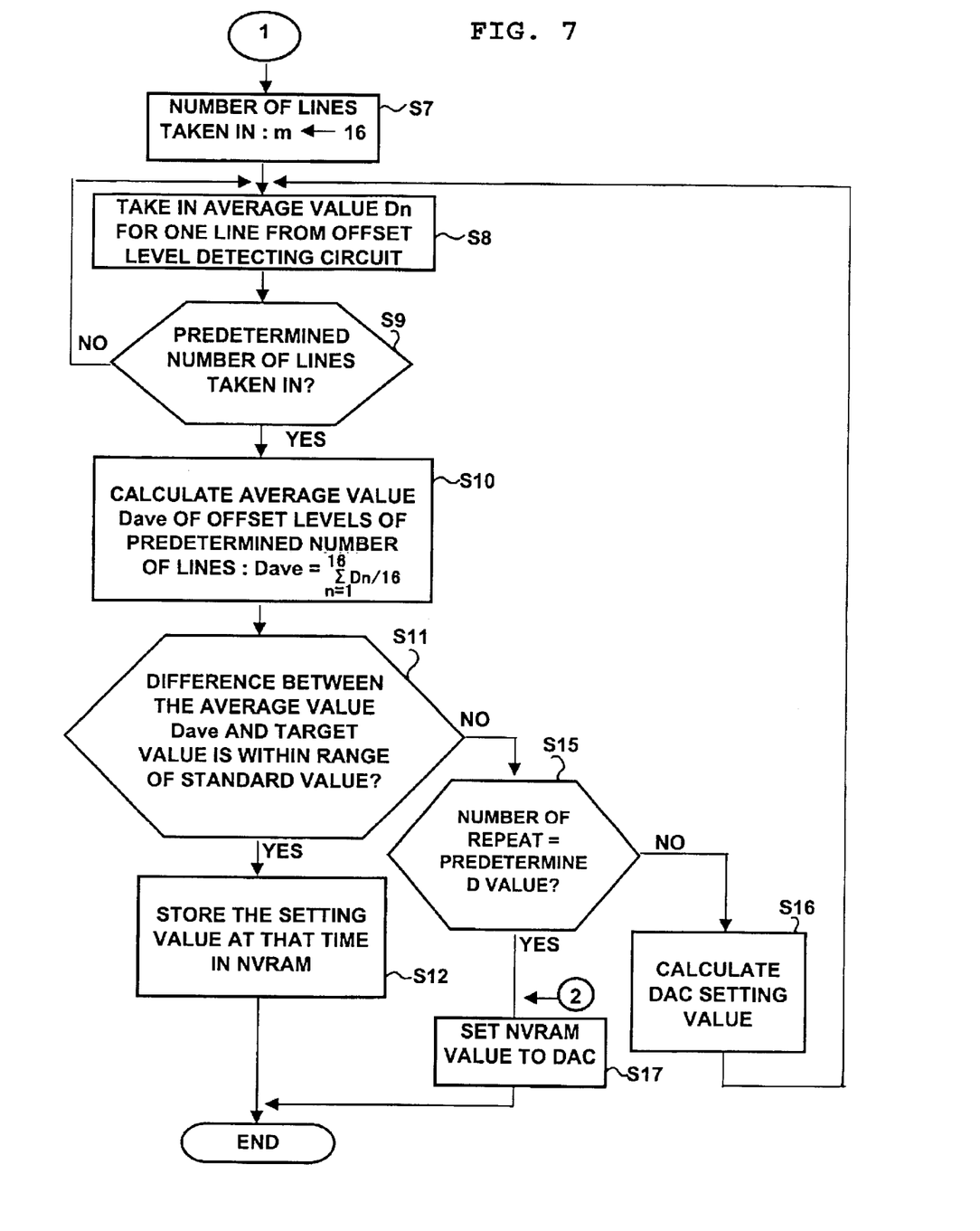
FIG. 7 is a flowchart illustrating another portion of the offset adjustment process.

As illustrated in FIGS. 6 and 7, at first, the microcomputer 17 executes initial setting of the image reading apparatus (Step S1). In this initial setting, typically the following settings are performed:
Setting timing of pulses for driving the CCD 10;
Setting timing of pulses for sampling in the sampling circuit 14;
Setting timing of the XOPB period;
Setting initial gain of the gain amplifier 15; and
Setting initial offset level Vof for the offset setting unit 16.

Next, an initial value for the number of lines m which is taken from the output of the CCD 10 during the XOPB period when the offset value starts to be adjusted, is set (Step S2). In this example, the number of lines m is set to four.

The microcomputer 17 reads the value of the offset level from the offset detecting circuit 20 when the offset level is adjusted (Step S3). Because this value is an average value Dn for one line of output levels of picture elements which is indicated by the XOPB period within the optical black (OPB) picture elements of the CCD 10, the average value is sought in the step S3.

The process of this step 3 is repeated (when No in Step 4) for the number of the lines m which is set in Step S2 (in this example, four times). After the processes of Steps S3 and S4 end (when Yes in Step 4), the microcomputer 17 seeks an average value Dave of the average values Dn which are taken in Steps 3 and 4 (Step S5).

Then, the difference between the average value Dave sought in Step S5 and a target value offset level is sought, and it is judged whether this difference is within a temporary standard value (in this example, two) of a first predetermined value which is previously set (Step S6). This step S6 realizes each of a first comparing device to compare the average value Dave to the target value, and a second comparing device to compare the difference between the average value Dave and the target value to temporary standard value.

The target value of the offset level is determined as set forth below. Because a digital signal cannot be a negative value, and the range of the output of the A/D converter 19 is 0–255 in an example of 8 bits, the offset level (analog value) must be positive value. Further, it is preferred that the offset level is small in the point that a dynamic range is made wide. On the other hand, the analog signal may have a negative value when the offset level is too small (although it is converted to zero as the digital signal). Therefore, in light of this point, a target value for the offset level is set in advance as a proper adjustment value which is not too small and not too large (generally, a value of about $5/255$ is set in 8 bits).

Figure 8:
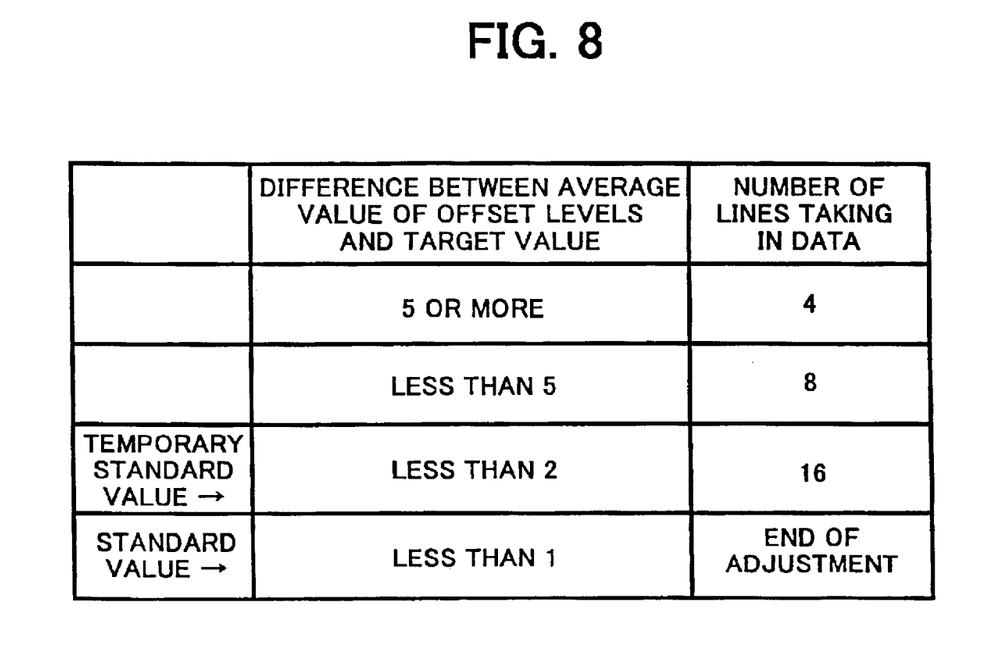
FIG. 8 is a table indicating a relationship between difference between the average value of the offset level and target value, and number of lines which take in output levels of a CCD, during the offset adjustment process.

When the difference between the average value Dave and the target value of the offset level is not within a range of a temporary standard value (No in Step S6), the number of lines m taken in from the output of the CCD 10 for offset level adjustment during XOPB period is set (Step S18). The setting of the number of lines m is executed so as to enlarge the range of the number of lines m as the difference between the average value Dave and the target value of the offset level becomes smaller. Specifically, for example, it is executed as indicated in the table of FIG. 8. In an example of FIG. 8, when the difference between the average value Dave and the target value of the offset level is five or more, the number of lines m is four, and when the difference is less than five, the number of lines m is eight, and when the difference is less than two, the number of lines m is sixteen. This Step S18 realizes an adjustment device to adjust the number of lines m on the basis of a difference of the average value Dave and the target value.

After Step S18, step S13 is performed. Step S13 determines the number of times the loop of Steps S3, S4, S5, S6, S18, S13, and S14 is performed. It is possible that the loop of these steps may never end, and if the number of times this loop is performed (e.g., "number of repeats") exceeds a predetermined value such as 5, 10, 15, or any desired number, the potentially endless loop ends with a Yes in Step S13. When the number of repeats does not reach the predetermined value (No in step 13), based upon the difference between the average value Dave and the target of the offset level, which has been sought in Step S5, and the setting value of the D/A converter 18, the next setting value of the D/A converter 18 is calculated and is set (Step S14), and the flow returns to Step S3.

A value, Dof, to which the setting value DAC of the D/A converter is set is calculated by the relationship of Dm, Dave, and Dof':
Dof=f(Dof', Dave, Dm), where:
f ( ) is a certain function (formula 0);
Dm: target value (for example $5/255$);
Dave: average value of a predetermined number of lines;
Dof': DAC setting value when Dave is obtained; and
Dof: value to which DAC is set.

Referring to FIG. 4, the relationship of an offset setting voltage Vof and an offset amount is indicated as a linear function:

$$\text{Dave} = a \times Vof + b \qquad \text{(formula 1)}$$

where "a" and "b" are fixed or predetermined values which are determined based on the specific circuit. Also, because Vof is an output of the DAC 18, the relationship of Vof and the DAC setting value Dof is linear.

$$\text{Dave} = a \times Vof + b \qquad \text{(formula 4)}$$
$$= c \times Dof' + d$$

where "c" and "d" are fixed values which are determined by the circuit (tolerance of parts which exist naturally). Because the difference between a target value and an offset amount at the present time is "DM-Dave", in order to make the offset amount to Dm, it is understood from formula 4 that (Dm-Dave)/c should be added to Dof.

$$\therefore Dof = Dof' + (Dm\text{-Dave})/c \qquad \text{(formula 2)}$$

Because "a" has tolerance, if formula 2 is applied just like that, the target value Dm may be improperly exceeded, and therefore (Dm-Dave)/c is not added just like that, and only some percentage in it is added and the target value is brought close gradually.

$$\therefore Dof = Dof' + k \times (Dm\text{-Dave})/c \qquad \text{(formula 3)}$$

Generally formula 0 is used, and in this embodiment, formula 2 and 3 may be used.

The processes in Steps S14 and S18 are repeated (when No in Step S13) until the difference between the average value Dave sought in Step S5 and the target value of the offset level is within the temporary standard value (when Yes in Step S6). In this case, when the number of repeats reaches the predetermined value (when Yes in Step S13), the setting value, stored in a predetermined NVRAM when the adjustment of the offset level has succeeded at previous time, is set to the D/A converter 18 (Step S17). The number of the repeat is checked for preventing falling into endless loop.

In Step S6, when the difference between the average value Dave and the target value of the offset level is within the temporary standard value (when Yes in Step S6), flow proceeds to process 1 of FIG. 7 and the number of lines m is made to maximum number of sixteen (Step S7). This Step S7 also realizes the adjustment device to set the number of lines m to the maximum number of sixteen when the difference between the average value Dave and the target value is within the temporary standard value.

Then, the microcomputer 17 reads the offset value from the offset detecting circuit 20. This value is the average value Dn of output level values for one line of picture elements which are indicated by the XOPB period within the optical black picture elements of the CCD 10, as in the Step S3 (Step S8). The process in this Step S8 is repeated (when No in Step S9) for the number of lines (in this example, sixteen times) which is set in Step S7. When the process in Step S8 ends (when Yes in Step S9), the microcomputer 17 calculates the average value Dave of the average values Dn which are taken in Steps S8 and S9 (Step S10).

Then, it is judged whether the difference between the average value Dave obtained in Step S10 and the target value of the offset level is within standard value (in this example, one), which is a second predetermined value and is smaller than the temporary standard value previously set (Step S11). This Step S11 realizes each of the first comparing devices to compare the average value Dave to the target value, and a third comparing device to compare the difference between the average value Dave and the target value to the standard value. If the difference is within the standard value (when Yes in Step S11), the adjustment of the offset level is ended. At that time, the setting value to the D/A converter 18 when the adjustment of the offset level is ended is stored in a predetermined NVRAM (Non-Volatile RAM), and then the adjustment is ended (Step S12). While the specification refers to NVRAM, any other type of memory may be used, as desired, including any type of nonvolatile memory such as an SRAM, flash memory, battery backed-up memory, etc.

In Step S11, if the difference between the average value Dave and the target value of the offset level is not within the standard value (No in Step S11), based upon the difference between the Dave and the target level of the offset level which is sought in Step S5, and the setting value of the D/A converter 18, flow proceeds to Step S15. Step S15 is utilized to prevent an endless loop in a similar manner as Step S13 prevents an endless loop. Subsequently, the next setting value is calculated and is set (Step S16), and flow is returned to Step S8. The process of Step S16 is repeated (when No in Step S15) until the difference between the average value Dave which is sought in Step S10 and the target value of the offset level is within the standard value (Yes in Step S11). In this case, when the number of repeat reaches a predetermined value (Yes in Step S15), the setting value stored in a predetermined NVRAM when the adjustment of the offset level has succeeded at previous time is set to the D/A converter 18 (Step S17).

According to the image reading apparatus 1 described above, when the difference between the average value Dave and the target value of the offset level is large, the adjustment time can be made short by reducing the range of the number of lines m, and when the difference between the average value Dave and the target value of the offset level is small, the adjustment accuracy of the offset level can be improved by enlarging the range of the number of lines m. That is, when the difference between the target value of the offset level and the average value Dave is large as when the adjustment has just started, because the difference only needs to be close to the target value roughly, the number of lines m is made small, and when the difference is small, the number of lines m is made large so that the adjustment of the offset level is executed accurately.

Further, by using the standard value which is comparatively small and the temporary standard value which is comparatively large, the final adjustment of the offset is executed by setting the number of lines m to the maximum range (sixteen) (Step S7) and by comparing the difference between the target value of the offset level and the average value Dave which is sought from the maximum range of number of lines m (Step S11).

This is for preventing the adjustment of the offset level from being ended when the difference between the target value of the offset level and the average value Dave happens to be within the standard value in spite of data including much noise, when the number of lines m is small (for example, four). Thus, the final adjustment of the offset level can be executed accurately in a state of low noise.

Further, by using the average value Dave of output level of the optical black picture elements which are used in black shading correction of the image data of the document 4, the offset is provided in the analog image signal before A/D conversion, and therefore a line buffer which storing for output levels of optical black picture elements for one line which is installed in the offset level detecting circuit can become unnecessary and the structure of the circuit can be made simple.

Figure 9:
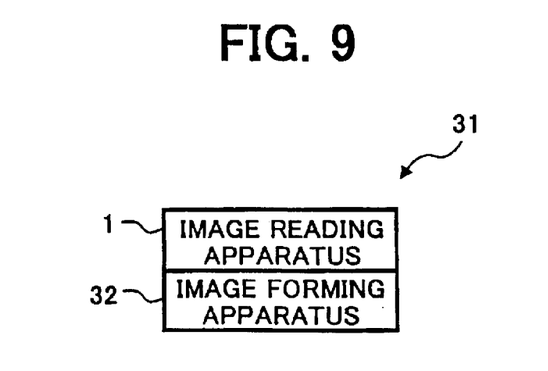
FIG. 9 is a block diagram illustrating the structure of a copying machine of a second embodiment of the present invention.

FIG. 9 is a block diagram showing structure of a copying machine 31 provided with the image reading apparatus 1 of the first embodiment and an image forming apparatus 32 which forms an image on a sheet by, for example elecrophotography process, on the basis of the image data of the document which is read by the image reading apparatus 1. As the image forming apparatus 32, various kinds of printing processes can be applied, such as ink jet process, sublimation thermal transfer process, silver photography process, direct thermal sensitive printing process, laser beam process using toner, and fusion type thermal transfer process etc. The specific structure of each process is known, and therefore detailed description is omitted.

According to this copying machine 31, substantially the same function and technical advantage as the first embodiment can be achieved.

According to one aspect of the present invention, in one situation, the adjustment accuracy for an offset level can be improved by enlarging the range of picture elements which are used for seeking an average of output levels, and, in another situation, the adjustment time can be made short by reducing the range of picture elements.

According to another aspect of the present invention, when a difference between the average value of the output levels and a target value is small, the adjustment accuracy can be improved by enlarging the range of the picture elements which are used for seeking the average of the output levels, and, when the difference between the average value of the output levels and the target value is large, the adjustment time can be made short by reducing the range of the picture elements.

According to still another aspect of the present invention, a final adjustment of the offset can be accurately achieved in a state of low noise, by making the range of the photoelectric transducer used for seeking the average of the output levels to be maximum, and by comparing the difference between the average value of the output level from the picture elements of the maximum range of the photoelectric transducer and a target value, to a second predetermined value which is a relatively smaller value.

According to still another aspect of the present invention, the offset is set in the analog image signal before A/D conversion using the average value of the output levels of the optical black picture elements of the predetermined range, which are used for the black level shading correction of the image data of the document, and therefore a line buffer which storing for output levels of optical black picture elements for one line which is installed in the offset level detecting circuit can become unnecessary and the structure of the circuit can be made simple.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 11-353829 filed in the Japanese Patent Office on Dec. 14 in 1999, and the entire contents of which are hereby incorporated by reference.

What is claimed as new and is desired to be secured by Letters Patent of the United States is:

1. An image reading apparatus comprising:
a photoelectric transducer configured to read an image of a document and to output an analog image signal;
an A/D converter configured to input the analog image signal and output a corresponding digital image signal;
an offset level detecting circuit configured to seek an average value of output levels from picture elements in a predetermined number of lines of image data taken from the photoelectric transducer;
an offset setting unit configured to provide an offset in the analog image signal before the A/D conversion on the basis of the average value;
a first comparing device configured to compare the average value to a predetermined target value; and
an adjusting device configured to adjust the predetermined number of lines of image data taken from the photoelectric transducer on the basis of a result of the comparison.

2. The image reading apparatus of claim 1, wherein the adjusting device increase the predetermined number of lines of image data taken from the photoelectric transducer when a difference between the average value and the target value is smaller than a predetermined value.

3. The image reading apparatus of claim 2, wherein the first comparing device comprises a second comparing device configured to compare the difference between the average value and the target value to a first predetermined value which is previously set, and a third comparing device configured to compare the difference to a second predetermined value which is previously set and which is smaller than the first predetermined value,
and further wherein, the adjusting device repeats the adjustment until the second comparing device judges that the difference is less than the first predetermined value, and when the difference is less than the first predetermined value, the predetermined number of lines of image data taken from the photoelectric transducer is made a maximum, and the third comparing device compares the difference to the second predetermined value after the predetermined number of lines of image data taken from is made maximum.

4. The image reading apparatus of claim 1, wherein the picture elements in the predetermined range of the photoelectric transducer are optical black picture elements of the photoelectric transducer.

5. A copying machine comprising:
an image reading apparatus including;
a photoelectric transducer configured to read an image of a document and to output an analog image signal;
an A/D converter configured to input the analog signal and output a corresponding digital image signal;
an offset level detecting circuit configured to seek an average value of output levels from picture elements in a predetermined number of lines of image data taken from the photoelectric transducer;
an offset setting unit configured to provide an offset in the analog image signal before the A/D conversion on the basis of the average value;
a first comparing unit configured to compare the average value to a predetermined target value; and
an adjusting device configured to adjust the predetermined number of lines of image data taken from the photoelectric transducer on the basis of a result of the comparison; and
an image forming apparatus configured to form an image on the basis of image data of a document which is read by the image reading apparatus.

6. An image reading apparatus comprising:
transducing means for reading an image of a document and for outputting an analog image signal;
A/D converting means for converting the analog signal to a digital image signal;
offset level detecting means for seeking an average value of output levels from picture elements of a predetermined number of lines of image data taken from the transducing means;
offset setting means for providing an offset in the analog image signal before the A/D conversion on the basis of the average value;
first comparing means for comparing the average value to a predetermined target value; and
adjusting means for adjusting the predetermined number of lines of image data taken from the transducer means on the basis of a result of the comparison.

7. A method or image reading, comprising:
reading an image of a document and outputting an analog image signal with a photoelectric transducer;
converting the analog signal to a digital image signal;
seeking an average value of output levels from picture elements of a predetermined number of lines of image data taken from the photoelectric transducer;
setting offset in the analog image signal before the A/D conversion on the basis of the average value;
comparing the average value to a predetermined target value as a first comparing; and
adjusting the predetermined number of lines of image data taken from the photoelectric transducer on the basis of a result of the comparison.

8. The method of claim 7, wherein the adjusting comprises:

adjusting the predetermined number of lines of image data taken from the photoelectric transducer to be increased when a difference between the average value and the target value is smaller than a predetermined value.

9. The method of claim 8, wherein the first comparing includes comparing the difference between the average value and the target value to a first predetermined value which is previously set as a second comparing, and a comparing the difference to a second predetermined value which is previously set and is smaller than the first predetermined value as a third comparing, and further wherein, the adjusting step repeats the adjustment until the second comparing judges that the difference is less than the first predetermined value, and when the difference is less than the first predetermined value, the predetermined number of lines of image data taken from the photoelectric transducer is made a maximum, and the third comparing compares the difference to the second predetermined value after the predetermined number of lines of image data taken from is made maximum.

10. The method of claim 7, wherein the picture elements in the predetermined range of the photoelectric transducer are optical black picture elements of the photoelectric transducer.

11. An image reading apparatus comprising:

a photoelectric transducer configured to read an image of a document and to output an analog image signal;

an A/D converter configured to input the analog image signal and output a corresponding digital image signal;

an offset level detecting circuit configured to seek an average value of output levels from picture elements in a predetermined range of the photoelectric transducer;

an offset setting unit configured to provide an offset in the analog image signal before the A/D conversion on the basis of the average value;

a first comparing device configured to compare the average value to a predetermined target value; and an adjusting device configured to adjust a size of the predetermined range of the photoelectric transducer on the basis of a result of the comparison, wherein the adjusting device enlarges the predetermined range of the photoelectric transducer when a difference between the average value and the target value is smaller than a predetermined value, and wherein the first comparing device comprises a second comparing device configured to compare the difference between the average value and the target value to a first predetermined value which is previously set, and a third comparing device configured to compare the difference to a second predetermined value which is previously set and which is smaller than the first predetermined value, and further wherein, the adjusting device repeats the adjustment until the second comparing device judges that the difference is less than the first predetermined value, and when the difference is less than the first predetermined value, the predetermined range of the photoelectric transducer is made a maximum, and the third comparing device compares the difference to the second predetermined value after the predetermined range is made maximum.

12. The image reading apparatus of claim 11, wherein the picture elements in the predetermined range of the photoelectric transducer are optical black picture elements of the photoelectric transducer.

13. A method of image reading, comprising:

reading an image of a document and outputting an analog image signal with a photoelectric transducer;

converting the analog signal to a digital image signal.

seeking an average value of output levels from picture elements of a predetermined range of the photoelectric transducer;

setting offset in the analog image signal before the A/D conversion on the basis of the average value;

comparing the average value to a predetermined target value as a first comparing; and adjusting a size of the predetermined range of the photoelectric transducer on the basis of a result of the comparison, wherein the adjusting comprises adjusting the predetermined range of the photoelectric transducer to be larger when a difference between the average value and the target value is smaller than a predetermine value, and wherein the comparing includes a comparing the difference between the average value and the target value to a first predetermined value which is previously set as a second comparing, and a comparing the difference to a second predetermined value which is previously set and is smaller than the first predetermined value as a third comparing, and further wherein, the adjusting repeats the adjustment until the second comparing judges that the difference is less than the first predetermined value, and when the difference is less than the first predetermined value, the predetermined range of the photoelectric transducer is made a maximum, and the third comparing compares the difference to the second predetermined value after the predetermined range is made.

14. The method of claim 13, wherein the picture elements in the predetermined range of the photoelectric transducer are optical black picture elements of the photoelectric transducer.

* * * * *